United States Patent [19]

Scheller

[11] Patent Number: 4,668,885
[45] Date of Patent: May 26, 1987

[54] FLYWHEEL ENERGY STORAGE DEVICE

[76] Inventor: Wilhelm G. Scheller, Am Europakanal 7, 8510 Fürth-Dambach, Fed. Rep. of Germany

[21] Appl. No.: 831,060

[22] Filed: Feb. 19, 1986

Related U.S. Application Data

[63] Continuation of Ser. No. 577,256, Feb. 6, 1984.

[51] Int. Cl.$^4$ ............................................ F16L 39/00
[52] U.S. Cl. .................................. 310/90.5; 310/153; 310/157
[58] Field of Search ..................... 308/10; 310/74, 153, 310/90, 157, 152, 154, 156; 322/4; 74/572, DIG. 4; 335/306

[56] References Cited

U.S. PATENT DOCUMENTS

| | | | |
|---|---|---|---|
| 3,158,750 | 11/1964 | Roes | 308/10 UX |
| 3,597,022 | 8/1971 | Waldron | 308/10 |
| 3,845,995 | 11/1974 | Wehde | 308/10 |
| 3,899,223 | 8/1975 | Baermann | 308/10 |
| 3,958,842 | 5/1976 | Telle | 308/10 |
| 4,077,678 | 3/1978 | Studer | 308/10 |
| 4,256,352 | 3/1981 | Petrak | 308/10 |
| 4,260,915 | 4/1981 | Kawasumi | 310/157 |
| 4,329,889 | 5/1982 | Hachiya | 74/572 |
| 4,458,156 | 7/1984 | Maucher | 310/74 |
| 4,471,331 | 9/1984 | Wyatt | 308/10 |

FOREIGN PATENT DOCUMENTS

| | | | |
|---|---|---|---|
| 2716960 | 10/1978 | Fed. Rep. of Germany | 308/10 |
| 0079652 | 6/1979 | Japan | 308/10 |
| 0006918 | 1/1981 | Japan | 308/10 |
| 0073223 | 5/1982 | Japan | 308/10 |
| 0148575 | 1/1955 | Sweden | 308/10 |

OTHER PUBLICATIONS

Die Velt, 5/4/80 (with translation).
"Satellite Flywheels with Magnetic Bearings & Passive Radial Centering", Poubeau, vol. 17, No. 2, pp. 93–98, 3/4–1980.
"Magnetic Bearing", Brandenberg, IBM Techn. Disclosure, vol. 3, No. 1, 6/1960.
Electromagnetic Devices, Part III, p. 472, 1977.

Primary Examiner—R. S. Skudy
Attorney, Agent, or Firm—Holman & Stern

[57] ABSTRACT

A structure flywheel energy-storage device is disclosed comprising a rotatable flywheel mounted on a vertical shaft and provided with a bearing. The flywheel is in the form of a magnetic ring structure with a spacing element disposed between the ring structure and the shaft and with magnetic supporting structure to support the rotary magnetic ring structure. The use of the magnetic supporting structure enables the flywheel, once set in rotation with a given quantity of delivered energy, to rotate much longer than if purely mechanically supported.

2 Claims, 3 Drawing Figures

FLYWHEEL ENERGY STORAGE DEVICE

This is a continuation of application Ser. No. 06/577,256, filed Feb. 6, 1984.

BACKGROUND OF THE INVENTION

1. Technical Field

The invention relates to a flywheel energy-storage device. More particularly the present invention relates to a rotatable flywheel mounted on a vertical shaft and provided with a bearing, said flywheel being releasably couplable to a drive mechanism and interacting with a driven mechanism.

2. Prior Art

A known energy-storage device of this type is installed in the transmission of an automobile (see the newspaper Die Welt, of Apr. 5, 1980). An electric motor sets the flywheel into rotation at high rpm. The kinetic energy of the flywheel is used to drive an electric generator. If the heavy flywheel is rigidly mounted on the shaft which then has bearings on each of its two ends, the lower bearing must support the weight of the flywheel. Since the friction losses are quite high, a large part of the kinetic energy of the flywheel is lost to friction.

SUMMARY OF THE INVENTION

Accordingly, it is an object of the invention to provide a flywheel energy-storage device with a greater degree of utilization or availability of the stored kinetic energy, as a result of an improvement in the bearing system of the flywheel wherein friction losses are reduced by simple means.

The inventive accomplishment of this object comprises a flywheel in the form of a magnetic ring structure with a spacing element disposed between said ring structure and the shaft, and a magnetic supporting means disposed between said rotary magnetic ring structure and a second magnetic ring structure disposed concentrically to the first.

The flywheel is thus suspended, so to speak, with respect to the second magnetic ring structure, whereby the mechanical bearing basically needs to withstand only radially directed forces, since it is relieved of downwardly directed forces. By the use of the magnetic supporting means, the flywheel, once set in rotation with a given quantity of delivered energy, can rotate much longer than if purely mechanically supported. The structure is a simple one, since the flywheel itself comprises part of the magnetic supporting means, and the rotary magnetic ring structure serves to act as a support.

The inventive flywheel energy-storage device is generally installed in a transmission, particularly the transmission of an automobile which usually has a heavy flywheel. The flywheel of the present invention is rotatable or rotatably mounted on a fixed shaft, or is fixed to a rotatable shaft which shaft has bearing means on both ends. The magnetic supporting means of the flywheel, and the realization of the flywheel in the form of a magnetic ring structure, are essential features of the invention. The magnetic ring structure may comprise electromagnets, but for simplicity it will generally comprise permanent magnets. The spacing element is generally comprised of a material which is nonmagnetic and nonmagnetizable, e.g. plastic, or brass.

It is particularly advantageous if the radial dimension of the spacing element is equal to or greater than the radial dimension of the rotary magnetic ring structure. Thus the spacing element is not only a type of hub by means of which the magnetic ring structure rests on the shaft, but from the standpoint of radius, i.e., moment of inertia it also comprises a substantial part of the flywheel. The magnetic ring structure comprises the rim of the flywheel.

The invention also comprises magnetic supporting means, which, while of general applicability, are particularly suited for application with the inventive flywheel energy-storage device. Desirable features of the magnetic supporting means include long operating life, high carrying capacity of the magnetic field and low floor space requirements. The magnetic supporting means are devised so as to maximally avoid the development of rotational fields and interference currents.

It is particularly advantageous if magnetic supporting means are employed wherein like poles of the magnetic ring structures, said structures considered as units, point toward each other, and a substantial proportion of the rotary magnetic ring structure is disposed over the stationary magnetic ring structure. With this configuration, the operating life and carrying capacity are improved, although the arrangement of the two magnetic ring structures one extending above the other necessitates more headspace. The heavier the rotary magnetic ring structure is, the further it must extend in the vertical direction down into the stationary magnetic ring structure.

It is also particularly advantageous if the inner diameter of the stationary magnetic ring structure is appreciably greater than the outer diameter of the rotary magnetic ring structure, and when magnetized the two magnetic ring structures are radially magnetized, with the poles at the radially inner and outer wall surfaces. Supporting means of this type provide further improved carrying capacity and operating life. The flywheel is suspended above the axial cavity of the stationary magnetic ring structure, and is supported by the mutual repulsion of the two magnetic fields.

It is further particularly advantageous if the magnetic ring structures are provided with ring-shaped peripheral strips comprised of soft iron material, one such strip disposed on the radially outer circumference of the rotary magnetic ring structure and the other disposed on the radially inner circumference of the stationary magnetic ring structure. The soft iron rings are arranged in a way so as to influence the magnetic field of the magnetic supporting means such that greater carrying capacity is achieved.

It is further particularly advantageous if each magnetic ring structure comprises a ring-shaped array of discrete bar magnets. These bar magnets are relatively simple and inexpensive to manufacture, and obviate the need to magnetize large ring magnets.

It is further particularly advantageous if the axial and/or radial dimensions of the stationary permanent-magnet or of magnetic ring structure are greater than the corresponding dimensions of the rotary permanent-magnet or magnetic ring structure. This also results in improved carrying capacity and operating life.

It is further particularly advantageous if the bearing comprises a ball bearing or roller bearing the cage of which is comprised of a nonmagnetic material. Such ball or roller bearings, with cages comprised of, e.g., a plastic material, are not influenced by the magnetic fields of the magnetic ring structures; and as a consequence the operating life of said bearings is increased.

DETAILED DESCRIPTION OF THE INVENTION

The drawings illustrate a preferred embodiment of the invention.

Figure 2:
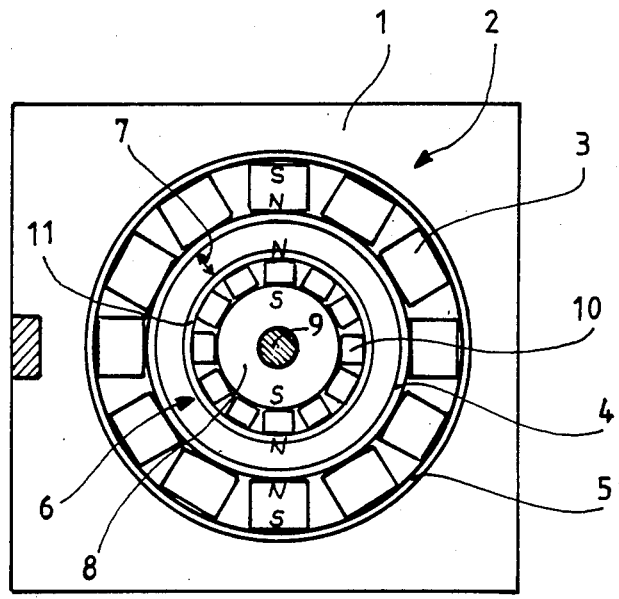
FIG. 2 shows a cross section through line II—II of FIG. 1.

The flywheel energy-storage device is associated with an automobile transmission (not shown), and is couplable to a drive mechanism, e.g. a motor, in order to bring the flywheel up to high rpm and impart rotational energy to it. After the flywheel has been energized, the drive mechanism is disengaged. The rotation of the flywheel effects operation of a driven mechanism or device, by either starting or maintaining the latter's operation. Said driven mechanism may be, e.g., an electrical generator which feeds a storage battery which is connected in turn to an electric motor.

In the flywheel energy-storage device, a larger magnetic ring structure 2 rests on a base plate 1. Structure 2 is comprised of discrete elongated permanent bar magnets 3 with their longitudinal dimension running vertically. These magnets 3 may be closely spaced or if necessary may be somewhat separated. Each permanent magnet 3 is magnetized such that the north pole N is disposed radially inwardly and the south pole S is disposed radially outwardly. The magnets 3 rest against the radially interior side of a soft iron ring 4 which has the shape of a cylindrical section (pipe length) of length equal to the vertical length of the permanent magnets 3, the ring 4 having an inner diameter. On the radially outer side the magnets are surrounded by a holding element 5.

Above the radially central cavity 99 of the stationary magnetic ring structure 2 there is suspended a smaller, rotary magnetic ring structure 6 which does not penetrate said cavity 99 or does so only slightly. The radial dimension of the gap 7 between the two magnetic ring structures depends on other parameters; here it has been chosen smaller than the outer radius of the rotary magnetic ring structure 6. Magnetic ring structure 6 rests on a central spacing element 8, together with which it forms a flywheel. The spacing element 8 is circular in shape, is comprised of a nonmagnetic material, e.g. plastic, and its radially interior part comprises a disk. The flywheel (i.e., the spacing element 8 and the magnetic ring structure 6) is rigidly attached to and rests on a shaft 9 having a vertical axis comprised of a nonmagnetizable material.

The smaller magnetic ring structure comprises smaller elongated permanent bar magnets 10 with their longitudinal dimension running vertically. The magnets 10 may be closely spaced or may be somewhat separated. Each permanent magnet 10 is magnetized such that the north pole N is disposed radially outwardly and the south pole S is disposed radially inwardly. The magnets 10 rest against the radially interior side of a soft iron ring 11 which has the shape of a cylindrical section (pipe length) of length equal to the vertical length of the permanent magnets 10, and having an outer diameter. Repulsive forces arise between the permanent magnets 10 of the rotary magnetic ring structure 6 and the permanent magnets 3 of the stationary magnetic ring structure 2.

A cross beam 12 extends over the rotary magnetic ring structure 6. The shaft 9 is rotatably mounted in the cross beam 12 and in the base plate 1 by means of a pair of bearings 13 having cages comprised of plastic material. The forces which must be borne by these bearings are primarily radial.

Between each permanent magnet 10 and the spacing element 8 a metal e.g., plate (not shown) is disposed which shields the permanent magnet(s) and prevents the formation of rotational fields. The holding element 5 is a cylinder having an outer diameter acts only as a constraint, and may be e.g. a wire coil. The transmission of magnetism i.e., the magnetic field to the bearings 13 of the shaft 9 is (substantially) prevented in that the shaft and/or the spacing element is comprised of a nonmagnetizable material, e.g. brass.

Figure 1:
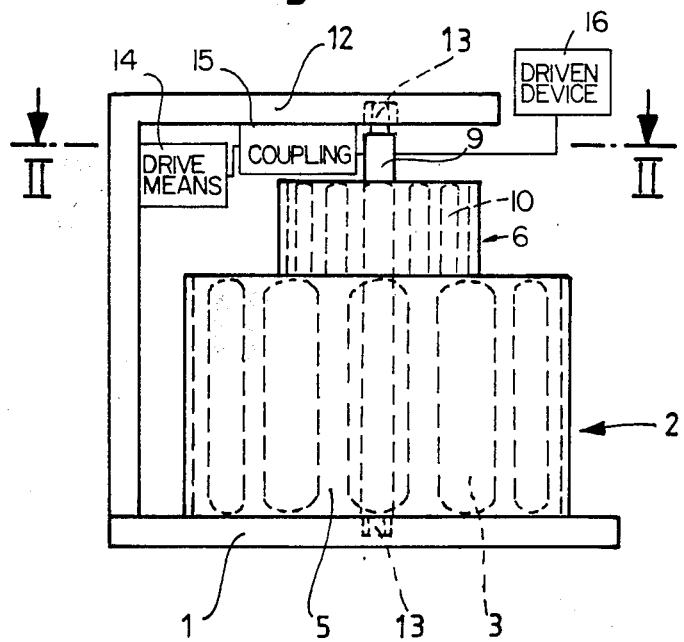
FIG. 1 shows a side view of a flywheel energy-storage device.
Figure 3:
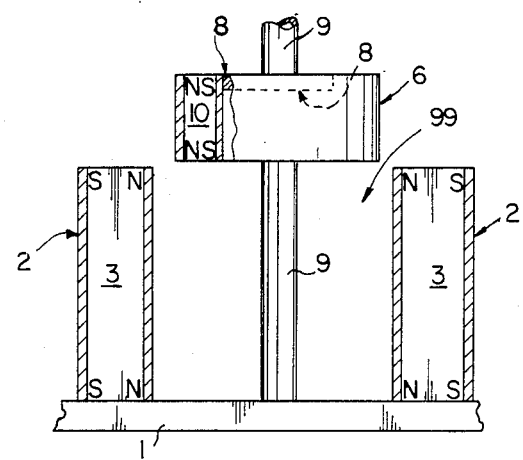
FIG. 3 is a side sectional view of the apparatus of FIG. 1.

A drive means 14, a coupling means 15, and a driven device 16 are schematically shown in FIG. 1. FIG. 3 corresponds to FIG. 1, with portions broken away for clarity. The wall thickness shown in section in FIG. 3 corresponds to the wall thickness seen in FIG. 2.

I claim:

1. An energy-storing flywheel device for a motor vehicle comprising: a rotary flywheel on a vertical shaft, said flywheel being releasably couplable to a drive means and being adapted to drive a driven mechanism;

said shaft having a shaft axis;

a bearing means for journally supporting said shaft, said flywheel including a rotatable magnetic ring structure supporting a plurality of permanent magnets; and a spacing piece disposed between said rotatable magnetic ring structure and said shaft;

and a magnetic supporting means for said rotatable magnetic ring structure, said magnetic supporting means comprising a stationary magnetic ring structure concentric about said shaft axis and below said rotary ring structure; said stationary magnetic ring structure supporting a plurality of permanent magnets;

said rotatable magnetic ring structure having an outer diameter; said stationary magnetic ring structure having an inner cavity, said inner cavity having an inner diameter; wherein said inner diameter of said inner cavity of said stationary ring structure is greater than said outer diameter of said rotatable magnetic ring structure, and said permanent magnets of both magnetic ring structures are radially magnetized, with the respective magnetic poles thereof disposed on radial inner and outer surfaces of each of said pluralities of permanent magnets, wherein like poles of said permanent magnets in the respective ones of said stationery magnetic ring structure and said rotatable magnetic ring structure, such that repulsive magnetic forces arise between the permanent magnets of said stationary magnetic ring structure and the permanent magnets of said rotatable magnetic ring structure face each other;

whereby said rotatable ring structure is suspended by magnetic repulsive forces arising between said like poles which face one another;

each of said magnetic ring structures having its respective plurality of permanent magnets disposed as an annular series of separate bar magnets, and including respective soft iron cylinders for supporting said bar magnets; on of said cylinders forming an outer circumference of said rotatable magnetic ring structure and the other of said cylinders forming an interior circumference of said stationary magnetic ring structure.

2. A device according to claim 1 wherein said spacing piece is a disk connecting said shaft to said rotary ring structure.

* * * * *